(12) United States Patent
Dumitrescu et al.

(10) Patent No.: US 8,860,984 B2
(45) Date of Patent: Oct. 14, 2014

(54) WORKFLOW GENERATION IN A PRINT SHOP ENVIRONMENT

(75) Inventors: Tiberiu Dumitrescu, Simi Valley, CA (US); Daniel Hufnagel, Williamson, NY (US); Michael Raines, Austin, TX (US)

(73) Assignee: Ricoh Company, Ltd, Tokyo (JP)

( * ) Notice: Subject to any disclaimer, the term of this patent is extended or adjusted under 35 U.S.C. 154(b) by 134 days.

(21) Appl. No.: 13/036,160

(22) Filed: Feb. 28, 2011

(65) Prior Publication Data

US 2012/0218591 A1   Aug. 30, 2012

(51) Int. Cl.
G06F 3/12   (2006.01)

(52) U.S. Cl.
CPC ............ *G06F 3/1204* (2013.01); *G06F 3/1285* (2013.01); *G06F 3/1275* (2013.01)
USPC .......... 358/1.15; 358/1.9; 358/1.13; 358/1.18

(58) Field of Classification Search
USPC .............. 358/1.15, 1.9, 1.18; 707/608; 705/8; 715/771, 772
See application file for complete search history.

(56) References Cited

U.S. PATENT DOCUMENTS

| | | | |
|---|---|---|---|
| 6,573,910 B1 | 6/2003 | Duke et al. | |
| 6,825,943 B1 | 11/2004 | Barry et al. | |
| 7,051,328 B2 | 5/2006 | Rai et al. | |
| 7,065,567 B1 | 6/2006 | Squires et al. | |
| 7,079,266 B1 | 7/2006 | Rai et al. | |
| 7,099,027 B1 | 8/2006 | Barry et al. | |
| 7,125,179 B1 | 10/2006 | Rai et al. | |
| 7,148,985 B2 | 12/2006 | Christodoulou et al. | |
| 7,558,638 B2 | 7/2009 | Chang et al. | |
| 7,626,717 B2 | 12/2009 | Rai et al. | |
| 8,120,801 B2 | 2/2012 | Zhang et al. | |
| 8,259,321 B2 | 9/2012 | Zhang et al. | |
| 8,284,423 B2 | 10/2012 | Jahn et al. | |
| 8,427,670 B2 | 4/2013 | Rai | |
| 8,650,152 B2 * | 2/2014 | Dettinger et al. | ............. 707/608 |
| 2002/0071134 A1 | 6/2002 | Jackson | |
| 2003/0041765 A1 | 3/2003 | Hill | |
| 2003/0061178 A1 | 3/2003 | Ogawa | |
| 2003/0177082 A1 * | 9/2003 | Buckwalter | ..................... 705/36 |
| 2003/0212611 A1 | 11/2003 | Barrot et al. | |
| 2004/0006522 A1 | 1/2004 | Keane | |
| 2004/0068424 A1 | 4/2004 | Lee et al. | |

(Continued)

FOREIGN PATENT DOCUMENTS

| | | | |
|---|---|---|---|
| EP | 1184779 A2 | 3/2002 | |
| EP | 1320008 A2 | 6/2003 | |

*Primary Examiner* — Allen H Nguyen
(74) *Attorney, Agent, or Firm* — Duft Bornsen & Fettig LLP

(57) ABSTRACT

Systems and methods are provided for generating workflows for incoming print data. The system generates a workflow for a print job based upon rules defined for the print shop. The system receives a print job for a customer. The system also stores rules, defined for customers, that describe logical relationships of activities at a print shop. Different combinations of the rules may be used to generate different workflows of print shop activities. The system identifies rules defined for the customer, identifies activities available at the print shop, and generates a workflow for the print job based on the rules defined for the customer, the available activities, and a job ticket of the print job, wherein the workflow comprises an ordered set of activities. The system also directs the resources of the print shop to perform the activities of the workflow.

20 Claims, 5 Drawing Sheets

(56) References Cited

U.S. PATENT DOCUMENTS

| | | |
|---|---|---|
| 2004/0111430 A1* | 6/2004 | Hertling et al. ............ 707/104.1 |
| 2004/0184061 A1 | 9/2004 | Christiansen |
| 2004/0196470 A1 | 10/2004 | Christiansen |
| 2004/0196493 A1 | 10/2004 | Christiansen |
| 2005/0065830 A1 | 3/2005 | Duke |
| 2005/0096770 A1 | 5/2005 | Chua et al. |
| 2005/0151993 A1 | 7/2005 | Gartstein |
| 2005/0154625 A1 | 7/2005 | Chua et al. |
| 2005/0248804 A1 | 11/2005 | Goel et al. |
| 2005/0275875 A1 | 12/2005 | Jennings, Jr. |
| 2006/0039026 A1 | 2/2006 | Lofthus et al. |
| 2006/0044597 A1 | 3/2006 | Dumitrescu et al. |
| 2006/0092467 A1 | 5/2006 | Dumitrescu et al. |
| 2006/0149755 A1 | 7/2006 | Marshall et al. |
| 2007/0070379 A1 | 3/2007 | Rai et al. |
| 2007/0091355 A1 | 4/2007 | Rai |
| 2007/0124182 A1 | 5/2007 | Rai |
| 2007/0177191 A1 | 8/2007 | Eschbach et al. |
| 2007/0185777 A1 | 8/2007 | Pyle et al. |
| 2007/0236708 A1 | 10/2007 | Jahn et al. |
| 2007/0242303 A1 | 10/2007 | Barry et al. |
| 2007/0247657 A1 | 10/2007 | Zhang et al. |
| 2007/0247659 A1 | 10/2007 | Zhang et al. |
| 2008/0137108 A1 | 6/2008 | Song et al. |
| 2008/0144080 A1 | 6/2008 | Randt |
| 2008/0170254 A1* | 7/2008 | Shah ........................ 358/1.15 |
| 2008/0180728 A1 | 7/2008 | Sekine |
| 2008/0256541 A1 | 10/2008 | Rai |
| 2008/0273213 A1* | 11/2008 | Steinhart et al. ............... 358/1.9 |
| 2008/0273224 A1* | 11/2008 | Maulsby et al. ............. 358/1.15 |
| 2008/0285067 A1 | 11/2008 | Rai |
| 2009/0033977 A1* | 2/2009 | Morales et al. ............. 358/1.15 |
| 2009/0043628 A1 | 2/2009 | Gombert |
| 2009/0063710 A1 | 3/2009 | Sekine |
| 2009/0063718 A1 | 3/2009 | Sekine et al. |
| 2009/0109464 A1 | 4/2009 | Knodt |
| 2009/0244600 A1* | 10/2009 | Haycock et al. ............. 358/1.15 |
| 2009/0251721 A1 | 10/2009 | Knodt |
| 2009/0279123 A1 | 11/2009 | Sekine |
| 2009/0279124 A1 | 11/2009 | Liu et al. |
| 2009/0279125 A1 | 11/2009 | Liu et al. |
| 2009/0281862 A1 | 11/2009 | Conescu et al. |
| 2009/0282412 A1 | 11/2009 | Sekine |
| 2010/0053657 A1* | 3/2010 | Weber ........................ 358/1.13 |
| 2010/0060909 A1 | 3/2010 | Conescu et al. |
| 2010/0195140 A1* | 8/2010 | Shepherd et al. ............ 358/1.15 |
| 2010/0231968 A1 | 9/2010 | Hirasawa et al. |
| 2010/0250267 A1* | 9/2010 | Brenner et al. ................ 705/1.1 |
| 2011/0037996 A1* | 2/2011 | DeRoller ..................... 358/1.15 |
| 2011/0075195 A1 | 3/2011 | Cain |
| 2011/0090529 A1 | 4/2011 | Hertling |
| 2011/0170893 A1* | 7/2011 | Nishikawa ...................... 399/81 |
| 2011/0199646 A1 | 8/2011 | Homma |
| 2012/0057191 A1 | 3/2012 | Gnanasambandam |
| 2012/0092688 A1 | 4/2012 | Pangrazio |
| 2012/0188587 A1 | 7/2012 | Gaertner |
| 2012/0212771 A1 | 8/2012 | Goddard |

* cited by examiner

WORKFLOW GENERATION IN A PRINT SHOP ENVIRONMENT

FIELD OF THE INVENTION

The invention relates to the field of print job management, and in particular, to generating workflows in a print shop environment.

BACKGROUND

Print shops are typically medium or large scale facilities capable of supplying printing services to meet a variety of customer demands. For example, print shops are often used to print documents for mass-mailing (e.g., customer bills, advertisements, etc.). Because print shops engage in printing on a scale that is hard to match, their customer base is usually varied. Print shop customers may therefore include both large institutional clients (e.g., credit card companies and banks), and small customers (e.g., small businesses and churches).

Print shops are generally arranged to print incoming jobs from customers in a way that is economical, yet fast. Thus, print shops often include a number of high-volume printers capable of printing incoming jobs quickly and at high quality. Print shops also typically include post-printing devices that are used to process the printed documents of each job (e.g., stackers, staplers, cutters, binders, etc.). Print shops may also provide digital/web publishing, e-mail, or other multimedia services to customers. Because print shops serve a variety of customers, they are often tasked with processing jobs that have varying printing formats, delivery dates, and media requirements. Print shops therefore often use a centralized print server that coordinates activity between printers and other devices of the print shop.

Customers submit their print jobs to print shops in a variety of formats. Along with the print data itself, a print job may include a job ticket describing what the customer wants (e.g., deliverable products, deadlines, e-mail blasts, etc.). For example, a customer may request that the print shop publish the print data at a web page and receive three copies of a printed document made from the print data. Customers may communicate their requests for services to the print shop in different ways. For example, a customer may use a Web-to-Print application that generates an XML or JDF file for the print shop, or a customer may simply telephone a print shop operator to request print shop services.

As jobs are received at a print shop from different customers, each job ticket may include different services requested by a customer. To perform services requested by customers, a print shop performs a set of print shop activities. For example, to print a bound document, a print shop may engage in activities such as "pre-flight" review of print data, printing the document, post-print binding the document, physically shipping the document to the customer, and billing the customer. A customer's requested services can vary with each incoming job, and print shop devices and personnel perform different activities to process incoming jobs having different requested services. However, deciding the specific activities to perform for incoming print data is often a time consuming process, and print shop operators desire ways to more quickly and easily generate an ordered set of discrete activities that a print shop may perform for incoming print jobs to meet the demands of customers.

SUMMARY

Embodiments described herein address the concerns of print shop operators and managers by using a set of rules to generate a workflow for each incoming print job, wherein the rules define the priority, resources, and the dependency of activities within a print shop. When a customer submits a print job to the print shop, a workflow generator of the print shop dynamically generates a workflow of activities to perform that are tailored to the print job. The workflow is generated based upon available activities in the print shop, a job ticket of the print job, and rules defined for the customer. These generated workflows determine the nature and order of activities to perform to meet customer demands for a specific job. Thus, custom workflows may be generated "from scratch" for each incoming print job.

One embodiment is a system that generates a workflow for a print job based upon rules defined for customers of the print shop. The system comprises an interface, a memory, a workflow generator, and a resource manager. The system stores rules defined for customers that describe logical relationships of activities at the print shop. Different combinations of the rules may be used to generate different workflows of print shop activities. The system receives a print job for a customer, and identifies rules that apply to the job (e.g., rules defined for the customer). The system then identifies activities available at the print shop, and generates a workflow for the print job based on the rules defined for the customer, the available activities, and a job ticket of the print job. The system also directs the resources of the print shop to perform the activities of the workflow.

Using the system described above, it is possible to generate workflows that are customized for incoming print jobs and customers. Furthermore, by generating these workflows "from scratch" as a print job is received, there is no need to generate and manage workflow templates prior to receipt of a print job. Rather, the rules allow the print shop to dynamically generate different workflows for different jobs and customers.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
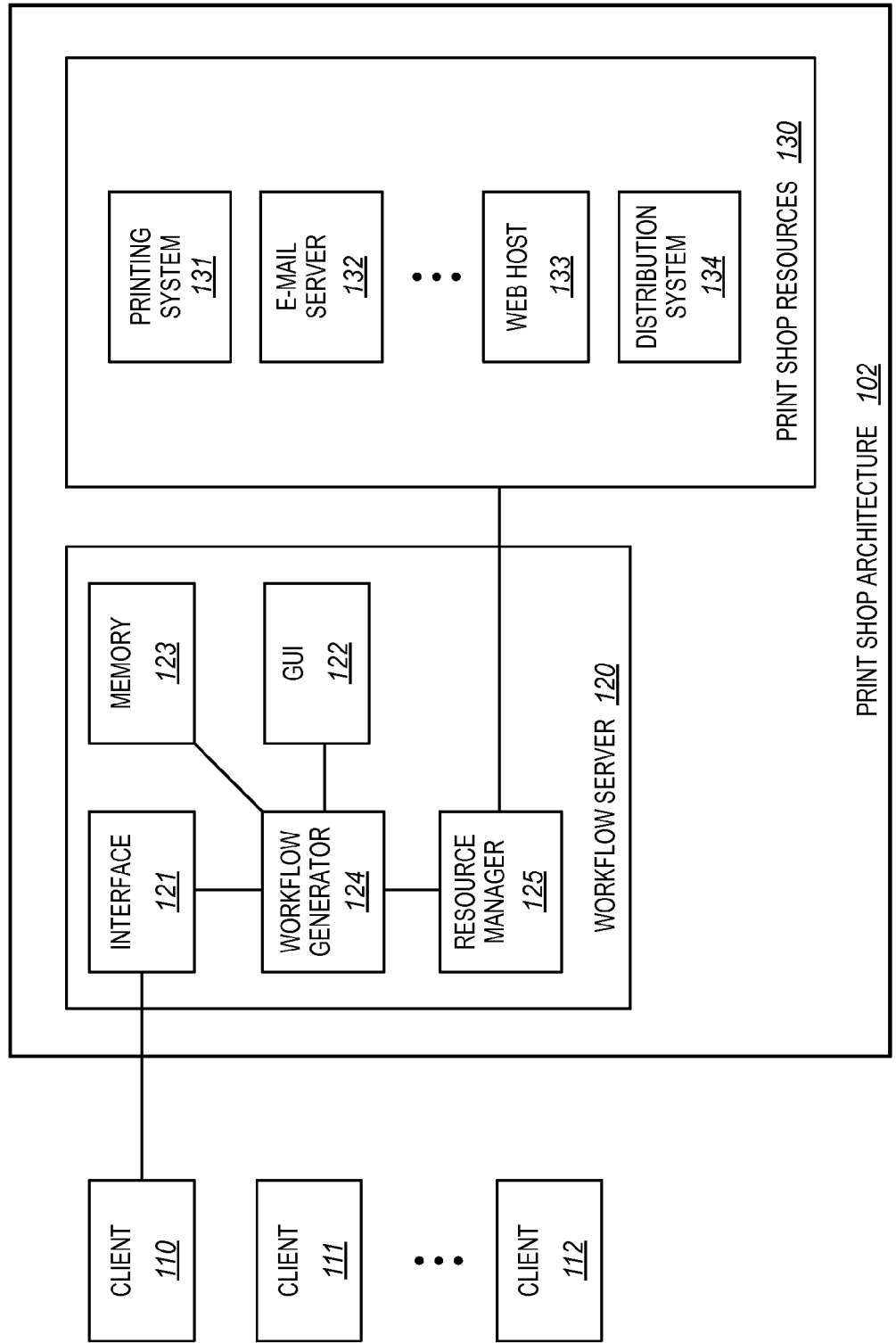
FIG. 1 is a block diagram illustrating a print shop architecture in an exemplary embodiment.

FIG. 1 is a block diagram illustrating a print shop architecture 102 in an exemplary embodiment. Print shop architecture 102 includes workflow server 120, which functionally connects one or more clients 110-112 to print shop resources 130. Clients 110-112 may be servers or software applications used by print shop customers. Clients 110-112 submit print data and job tickets that describe how the print data will be processed to interface 121. Workflow server 120 generates custom workflows for incoming print jobs, and manages print shop resources 130 in accordance with these workflows. The custom workflows are generated based on rules for the print shop, a job ticket of the print job, and activities available at the print shop.

Clients 110-112 may serve banks, credit card companies, or other customers having printing and document delivery needs (e.g., monthly bank statements, monthly credit card bills, etc.). Clients 110-112 may also serve customers with digital publishing needs (e.g., needs for e-mail services, web publishing services, and others). Information describing the services requested by the customer may be included in job tickets sent by clients 110-112.

Print shop resources 130 include the devices and components of the print shop that are used to perform print shop activities. For example, print shop resources 130 may include personnel, printers, post-printing machinery, e-mail or web publishing servers, media, ink, firmware versions for print shop devices, and others. Print shop resources 130 may exist within the confines of the print shop itself, or may comprise off-site devices and functional components managed by workflow server 120. The print shop resources 131-134 illustrated in FIG. 1 are merely meant to provide an example of the variety of print shop resources 130 that may be provided. For example, print shop resources 130 may include printing system 131 for transforming print data onto a suitable printable medium, such as paper. Other resources may include e-mail server 132 for generating e-mails, web host 133 for generating and hosting web pages or other internet content, and distribution system 134 for packaging and shipping printed documents.

While in operation, workflow server 120 identifies available activities that may be performed by print shop resources 130. Workflow server 120 may determine available print shop activities based upon the nature of print shop resources 130. For example, when print shop resources 130 include e-mail server 132, available activities may include generating e-mails, scheduling times to send e-mails, and selecting e-mail recipients. Activities may be associated with a category or type of resource (e.g., personnel, printers, servers) and may also be associated with specific named print shop resources (e.g., Susan, printing system 131, e-mail server 132).

Innumerable print shop activities may be defined, and certain print shop activities may be logically related with each other so that they have order and dependency relationships (e.g., a post-printing activity such as hole punching may depend upon the print data being successfully printed). A print shop operator may prioritize activities (e.g., to ensure that billing is the last activity performed), and may make certain activities required (e.g., billing may be required for every print job that enters the system). Furthermore, certain activities may be required, altered, or made optional based upon specific clients, customers, or information in a job ticket of the print job (e.g., services requested by the customer, multimedia parameters, size of the print data, format of the print data, etc.). For example, thank-you letters may be sent to high value or long-term customers, while credit checks may be performed upon new customers. The logical relationships of print shop activities are hereinafter referred to as "print shop rules" or "rules." In addition to printing activities, rules may regulate non-printing activities (e.g., billing, shipping, document review, multimedia/digital/internet activities, credit checks, etc.). In order to aid an operator of the print shop in managing rules and activities, a Graphical User Interface (GUI) 122 is provided for generation and manipulation of activities and rules. Workflow server 120 stores rules for the print shop in memory 123.

Once rules and activities have been defined, workflow generator 124 is operable to generate a workflow for a print job of a customer. Workflow generator 124 generates the workflow based on information in a job ticket of the print job (e.g., services requested by the customer, the size of a print job, etc.) and the rules for the print job (e.g., the rules for the customer). The available activities are dynamically scheduled into the customized workflow to defined an ordered set of activities to perform (including, for example, activities that run in parallel).

Resource manager 125 of workflow server 120 analyzes the generated workflow and directs print shop resources 130 to perform the activities defined by the workflow for a given print job. In one embodiment, resource manager 125 identifies activities that relate to specific print shop resources 131-134 (e.g., the activity "e-mail the client a printing status report" may relate to e-mail server 132), and instructs the specific resources to perform the identified activities. Resource manager 125 may further receive feedback from print shop resources 130 (e.g., information indicating that an activity has successfully completed).

Thus, while in operation, workflow server 120 receives and processes incoming print jobs from clients 110-112. Workflow server 120 determines the services requested by the customer, and dynamically generates (i.e., "from scratch") a workflow of activities to perform in order to achieve the services requested by the customer while complying with the rules of the print shop. These dynamically generated workflows are customized for each incoming job.

Figure 2:
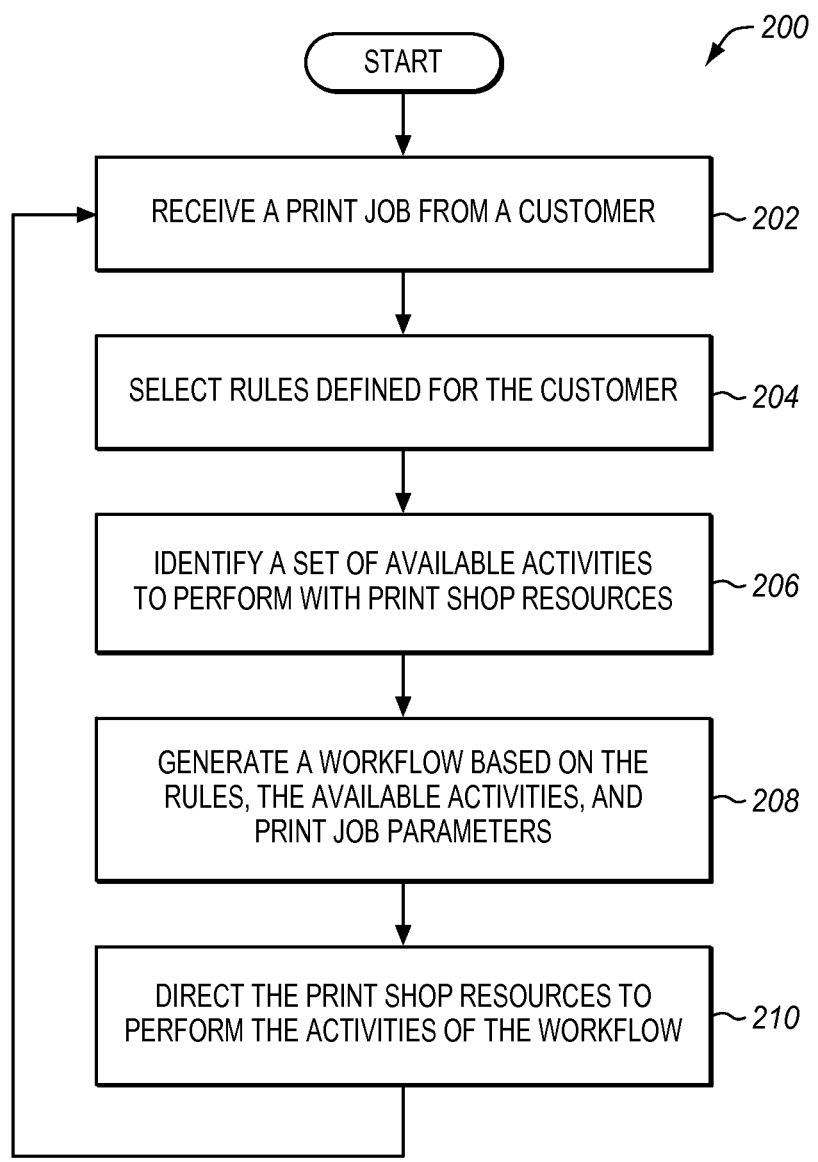
FIG. 2 is a flowchart illustrating a method for workflow generation in an exemplary embodiment.

FIG. 2 is a flowchart illustrating a method 200 for workflow generation in an exemplary embodiment. The steps of method 200 are described with reference to workflow server 120 of FIG. 1, but those skilled in the art will appreciate that method 200 may be performed in other systems or devices. The steps of the flowcharts described herein are not all inclusive and may include other steps not shown. The steps described herein may also be performed in an alternative order.

In step 202, interface 121 receives a print job from a customer. A print job may include print data and a job ticket. The job ticket may define, for example, parameters for multimedia or printing activities, print job handling requirements, or services requested by the customer. Print jobs are received from clients 110-112. Print jobs may be received in any of a variety of formats known to one of ordinary skill in the art.

In step 204, workflow generator 124 engages in the workflow creation process by identifying rules defined for the print job, such as rules defined for the customer that submitted the print job. The rules may be identified based upon information in the job ticket of the print job. For example, the customer may be identified based upon information in a job ticket for the print job, information in memory 123 indicating the source of the print data, or information in the print data itself. Once the customer has been identified, workflow generator 124 may retrieve rules for the customer from memory 123. Different combinations of rules may be used to generate different workflows.

In step 206, workflow generator 124 identifies a set of available activities to perform with print shop resources 130. Print shop resources 130 may automatically indicate their status (e.g., "online," "busy," "offline") and available activities (e.g., e-mail, print, bind) to workflow server 120 as a set of JDF device capabilities. Each activity may be associated with a specific capability of a print shop resource 131-134. Workflow generator 124 may determine the availability of activities based on the availability of associated print shop resources.

In step 208, workflow generator 124 generates a custom workflow based on the rules for the print job (e.g., the rules for the customer), the set of available activities, and a job ticket of the print job. Custom workflows are not merely assigned from a predefined workflow template, but rather are generated "from scratch" depending upon available activities at the print shop. For example, custom workflows may not even exist for a print job until after the print job is received at workflow server 120. The workflow comprises an ordered set of print shop activities, and is arranged to conform with the print shop rules (e.g., the rules defined for the customer). To determine an activity to place at a location in the workflow, workflow generator 124 filters the available activities based upon a job ticket of the print job and the rules for the print job. Information in a job ticket of the print job may include print data and multimedia characteristics (e.g., e-mail addressees, print data size, print data format, etc.), as well as services requested by the customer (e.g., three copies, in black and white, delivered in one week). In one embodiment, workflow generator 124 analyzes the services requested by the customer to generate selection criteria for the activities. The rules may also provide criteria for choosing from the set of available activities of the print shop. For example, a rule may require a credit check activity to be performed for new clients. Using the job ticket and the rules for the customer, the available activities can be placed at specific locations in the workflow.

To aid workflow generator 124 in selecting an activity to place at a location in the workflow, print shop activities are associated with information that describes their resources, dependencies, and priorities. This information may be assigned to activities prior to receiving the print job. Furthermore, rules may alter the dependency, priority, and resource information for print shop activities under specific conditions. Resource information describes the print shop resources 130 used for a specific activity. Dependency information describes activities that are performed before the current activity. Priority information describes where the activity would be placed in the workflow if no dependency relationships existed between activities.

Workflow generator 124 may position activities in the workflow based upon their resource usage, dependencies, and priority (e.g., high priority activities may be performed before low priority activities). In certain circumstances, workflow generator 124 may place a low priority activity in front of a high priority activity. This may occur when the high priority activity is dependent upon the low priority activity. For example, a printed product generally cannot be shipped before it is printed. Thus, even if the activity of printing has a lower priority than the activity of shipping, printing may be scheduled to occur before shipping. In a similar fashion, workflow generator 124 may schedule a low priority activity in front of a medium priority activity, if a high priority activity depends upon the low priority activity. Using the dynamic workflow generation process described above, entirely different workflows can be generated for different print jobs, even when no such workflows existed in the system beforehand.

In step 210, resource manager 125 analyzes the generated workflow and directs the print shop resources 131-134 to perform the activities of the workflow. Resource manager 125 is further operable to receive feedback from each of print shop resources 131-134 indicating the progress of the resource for the current activity in the workflow. Once the workflow has been completed, resource manager 125 may delete the workflow from memory 123, or may otherwise remove the workflow from workflow server 120. Many workflows may be processed in parallel by workflow server 120, and workflow server 120 may generate a new workflow for each new incoming job by initiating method 200 at step 202.

Using the method 200 described above, rules can be used to define the priority, dependency, and resources of activities within a print shop. Once rules are defined, workflow server 120 is operable to dynamically generate (i.e., "from scratch") a workflow of activities to perform based upon the job tickets for incoming print jobs and the rules. Thus, customized workflows are dynamically generated for each incoming job. These dynamically generated workflows reduce the expense and time taken when determining how to process an incoming job.

EXAMPLES

In the following examples, additional processes, systems, and methods are described in the context of workflow server 120 as it dynamically generates customized workflows of print shop activities for incoming jobs.

Figure 3:
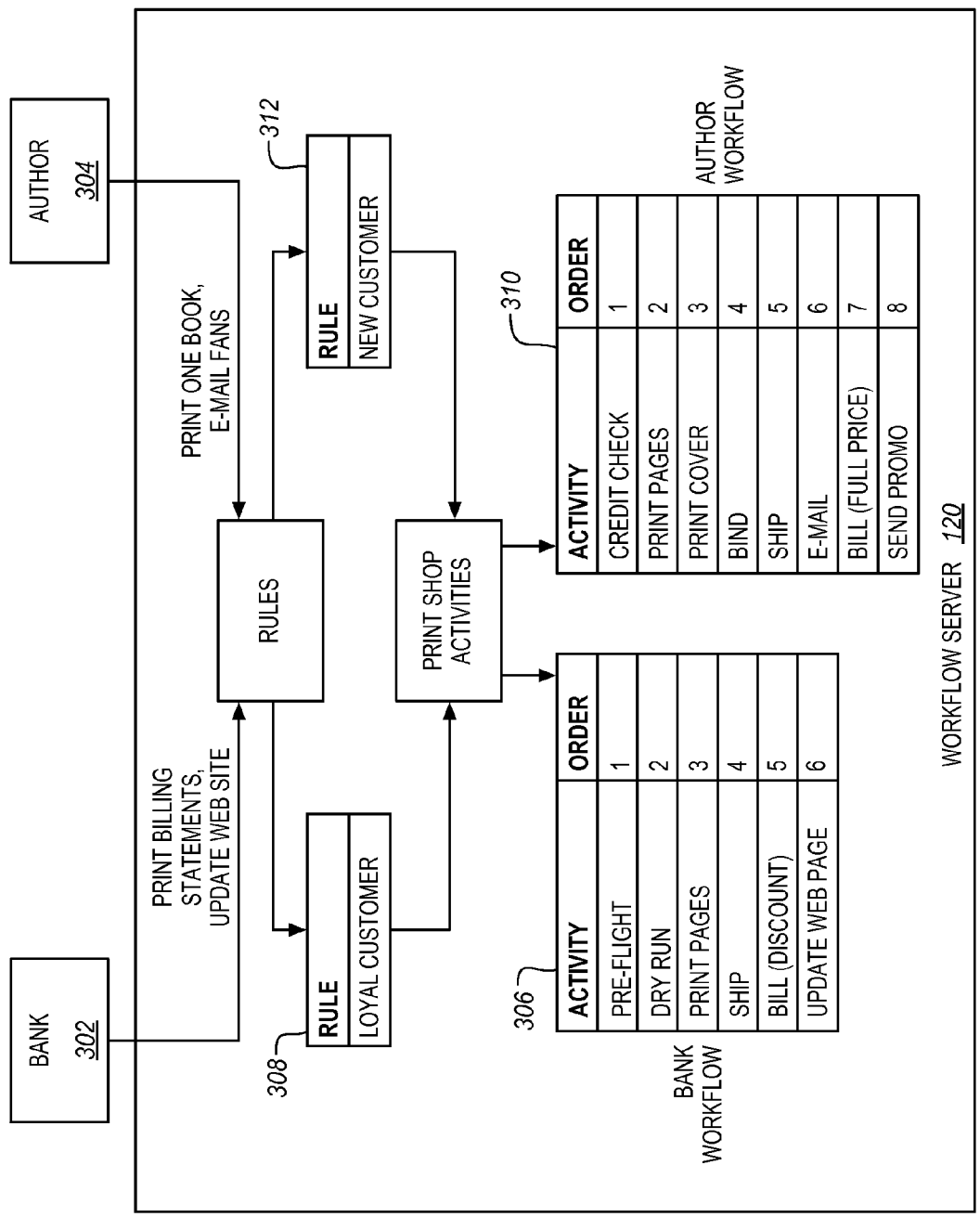
FIG. 3 is a block diagram illustrating additional details for generating a workflow in an exemplary embodiment.

FIG. 3 is a block diagram illustrating additional details for generating workflows in an exemplary embodiment. According to FIG. 3, a bank 302 and an author 304 each submit a print job to a print shop, and workflow server 120 generates a new workflow for each customer's print job based on the rules for each customer.

According to FIG. 3, bank 302 requests that the print shop print a large number of billing statements, and further requests an update to a web page to indicate the date that the billing statements were printed. Using rules for the job from bank 302 and a job ticket, workflow generator 124 originates bank workflow 306, which is customized for the print job from bank 302. Bank workflow 306 includes activities for pre-flight review, "dry run" printing, billing the customer (with a discount), and updating a web page of the customer. Discount billing is provided in workflow 306 because rule 308 identifies bank 302 as a loyal customer. "Dry run" printing (i.e., printing and reviewing a small sample of the print job before the job is printed in its entirety) is included in workflow 306 because the print job for bank 302 is identified as a large print job.

Also according to FIG. 3, author 304 requests one printed copy of a book, and further requests an e-mail to fans with a message related to the book. Workflow generator 124 generates a custom workflow for the print job from author 304 based upon rules for the job from author 304 and a job ticket. Author workflow 310 includes a credit check, an e-mail sent to fans, billing the customer (at the full rate), and sending a promotional offer encouraging future dealings with the print shop. Author workflow 310 includes a credit check and a "send promo" activity because rule 312 identifies author 304 as a new customer. "Pre-flight" printing is not included in workflow 310 because the print job for author 304 is identified as a small print job. Thus, substantially different customized workflows are generated for each of the incoming print jobs from bank 302 and author 304.

Figure 4:
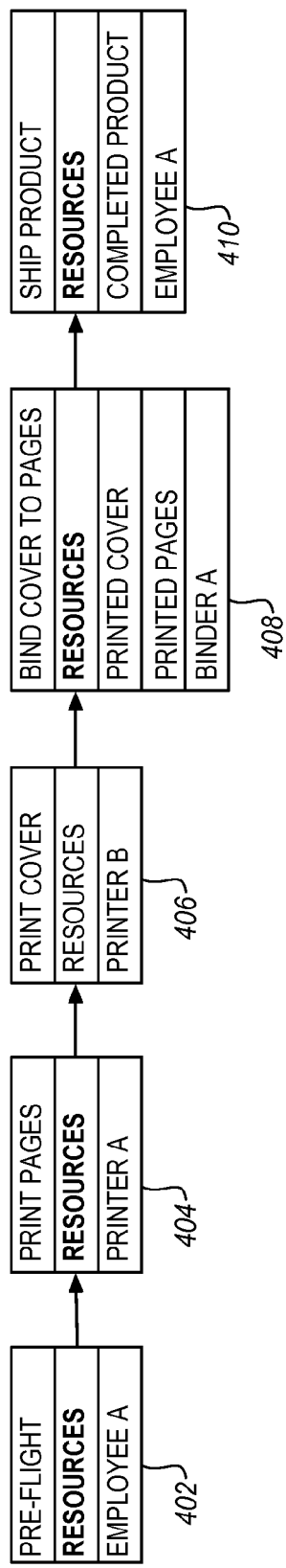
FIGS. 4 and 5 are block diagrams illustrating the creation of parallel paths for activities in a workflow in an exemplary embodiment.
Figure 5:
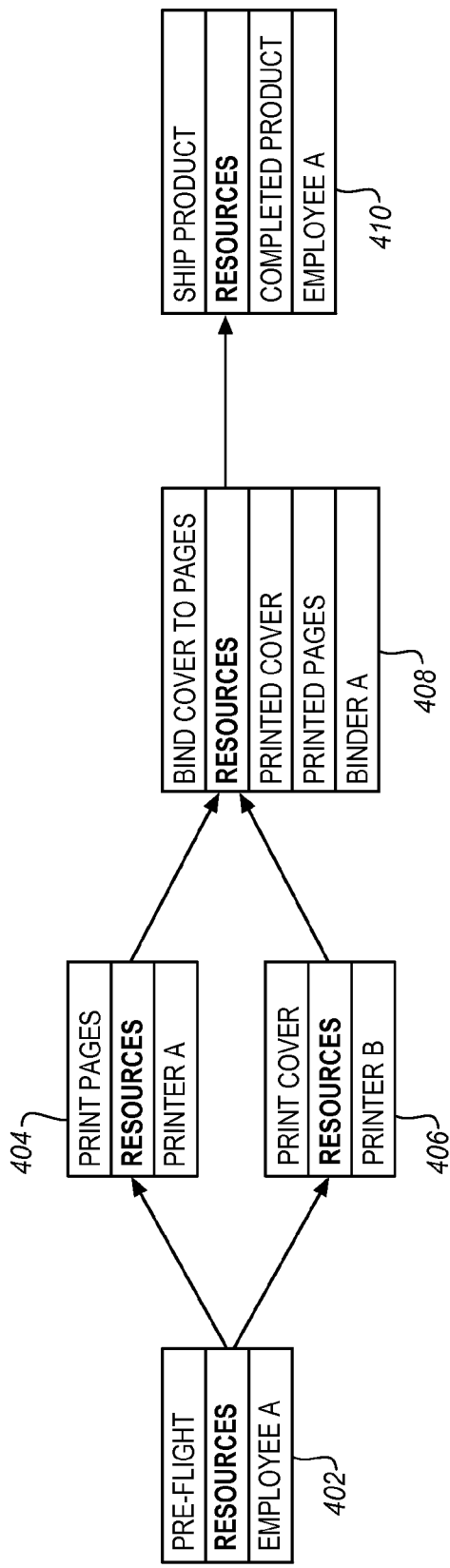

FIGS. 4 and 5 are block diagrams illustrating the creation of parallel paths for activities in a workflow in an exemplary embodiment. FIG. 4 illustrates a linear workflow that has been created by workflow generator 124. The workflow comprises activities including pre-flight 402, print pages 404, print cover 406, bind 408, and ship product 410. Each activity in the workflow is associated with a set of print shop resources 130 used to perform the activity. Some resources may be capable of being shared (e.g., it may be possible for e-mail server 132 to perform multiple activities in parallel), while other resources may be exclusive (e.g., printing system 131 may not be capable of performing printing activities in parallel). In this example, the linear workflow of FIG. 4 is parallelized to reduce the time taken to perform the workflow. This workflow is parallelized based upon the dependencies of the activities of the workflow, and also upon the resources utilized by the activities of the workflow. Assume, for this embodiment, that print pages 404 and print cover 406 are dependent upon pre-flight 402, that bind 408 is dependent upon both print pages 404 and print cover 406, and that ship product 410 is dependent upon bind 408. Workflow generator 124 makes the determination that print pages 404 and print cover 406 are dependent upon the same prior activity, and therefore identifies print pages 404 and print cover 406 as candidates for parallelization. Workflow generator 124 next determines that the resources used by print pages 404 and print cover 406 do not conflict with each other, and may be used at the same time (i.e., there will be no conflict if printer A is used at the same time as printer B). Because print pages 404 and print cover 406 are not dependent upon each other, and because they do not both require a resource that cannot be shared (i.e., the activities are independent), workflow generator 124 alters the workflow so that print pages 404 and print cover 406 are run in parallel in FIG. 5.

In a further example, workflow server 120 manages both on-site and off-site resources as part of print shop resources 130 (e.g., resources outside of the print shop or owned by another party). On-site and off-site resources may perform functionally similar activities (e.g., both may perform printing activities), and it may be preferable to perform certain functions with on-site activities or off-site activities depending upon the expected load at each resource (e.g., the number of activities scheduled at the resource) or the cost of performing the function at each resource. For example, performing a task using an off-site resource may generally be expected to result in quicker performance of the task, but may also be more expensive. Workflow server 120 may therefore use a set of default rules indicating when a function should be performed with activities using on-site or off-site resources. In one embodiment, workflow server 120 decides whether to bypass the default rules for an incoming print job. For example, a function may be moved to off-site resources when certain cost or load balancing criteria are met (e.g., if an on-site resource is overburdened, workflow server 120 may select a similar off-site resource to perform the same function).

In a further example, workflow generator 124 determines the cost and/or resource load associated with activities in the workflow performed for incoming print jobs. For example, a print shop resource may report the cost or time that it has taken to perform a given activity scheduled in a workflow for a print job, or a print shop operator may provide this information to workflow generator 124. This historic usage information may be stored in memory 123 and may be used to determine a predicted cost and/or load for each activity in the print shop. Predicted costs may depend, for example, upon a job ticket of the print job (e.g., print job size) or the type of activity (e.g., color printing vs. black and white printing). Furthermore, predicted cost or load may be based upon time of day or time of year (e.g., at the end of each month, each activity may routinely encounter a significantly higher load). In order to determine a predicted cost and/or load, regression techniques may be used to generate distribution curves (e.g., linear, quadratic, power, and exponential curves) that correlate the cost or load of an activity to customer rules or print job parameters (e.g., cost vs. print job size, time vs. load, etc.).

In a further example, workflow server 120 groups sets of related activities in the workflow, and arranges the workflow based upon the groups of activities. In this embodiment, activities are grouped based upon their functions (e.g., printing, e-mail, etc.) or resources used (e.g., printing system 131). Workflow generator 124 determines the resources, dependency, and priority of each group of activities as a whole, and generates workflows by locating the groups of activities in the workflow as if they were individual activities.

Figure 6:
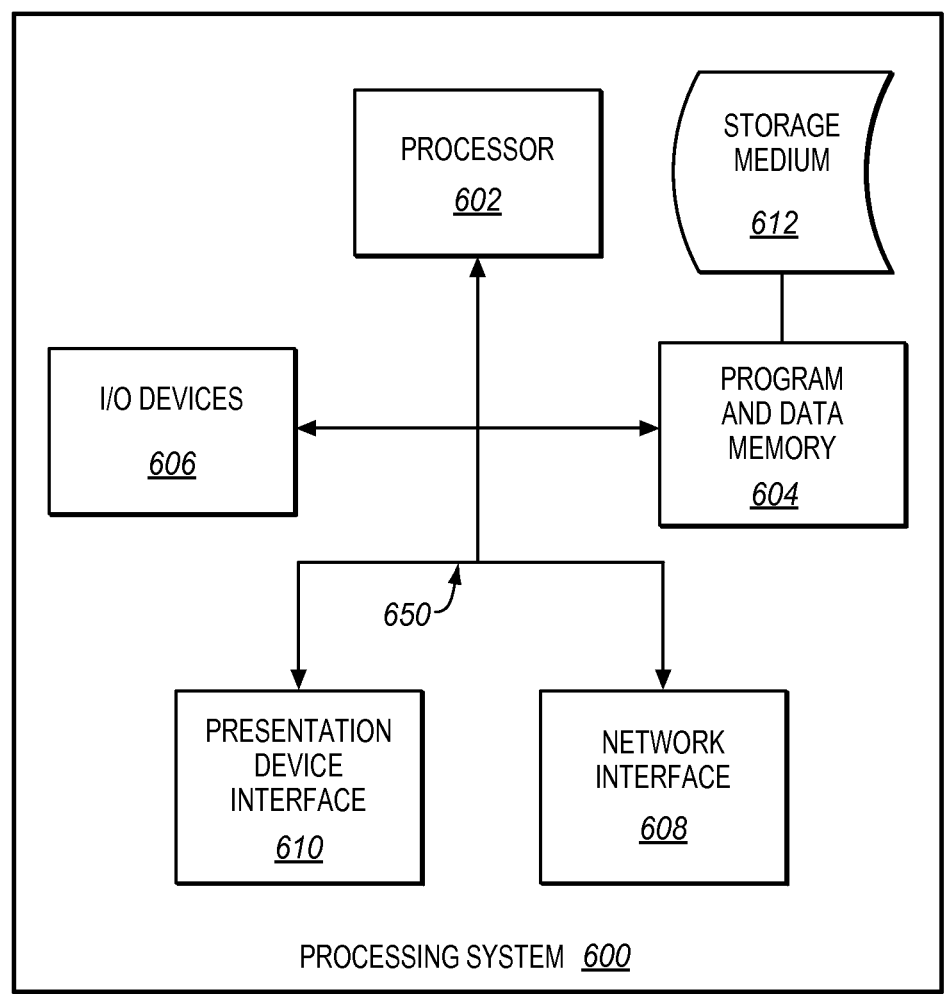
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of workflow generator 120 to perform the various operations disclosed herein. FIG. 6 illustrates a processing system operable to execute a computer readable medium embodying programmed instructions to perform desired functions in an exemplary embodiment. Processing system 600 is operable to perform the above operations by executing programmed instructions tangibly embodied on a computer readable storage medium 612. In this regard, embodiments of the invention can take the form of a computer program accessible via the computer-readable medium 612 providing program code for use by a computer or any other instruction execution system. For the purposes of this description, a computer readable storage medium 612 can be anything that can contain or store the program for use by the computer.

The computer readable storage medium 612 can be an electronic, magnetic, optical, electromagnetic, infrared, or semiconductor device. Examples of the computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 600, being suitable for storing and/or executing the program code, includes at least one processor 602 coupled to memory elements 604 through a system bus 650. The memory elements 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc) can be coupled to the system either directly or through intervening I/O controllers. Network adapter interfaces 608 may also be coupled to the system to enable the processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation devices, such as printing systems and displays for presentation of presentation data generated by processor 602.

Although specific embodiments were described herein, the scope of the invention is not limited to those specific embodiments. The scope of the invention is defined by the following claims and any equivalents thereof.

We claim:

1. A system comprising:
a memory that stores different workflow rules, defined for each of multiple different customers, that describe logical relationships of activities at a print shop;
an interface that receives print jobs for each of the multiple different customers;
a workflow generator that, for each of the print jobs, accesses the memory to identify workflow rules defined for the customer that the print job is for based on an identity of the customer, that identifies activities available at the print shop, and that generates a custom workflow for the print job based on the identified workflow rules defined for the customer, the available activities, and a job ticket of the print job, wherein each custom workflow comprises an ordered set of activities; and
a resource manager that directs resources of the print shop to perform the activities of each custom workflow,
wherein the workflow generator further identifies print shop resources used for the activities in a custom workflow, identifies sets of independent activities in the custom workflow based on the resources used by the workflow activities, and parallelizes the custom workflow by scheduling the sets of independent activities to be performed in parallel.

2. The system of claim 1, wherein:
the resource manager further detects completion of each custom workflow, and removes each custom workflow from the memory responsive to detecting its completion.

3. The system of claim 1, wherein:
each custom workflow is not based on one or more predefined templates, and each custom workflow does not exist in the memory prior to receiving the print job that the workflow is for.

4. The system of claim 1, wherein:
the rules define priorities for the print shop activities; and
the workflow generator creates each custom workflow based upon the priorities of the print shop activities.

5. The system of claim 1, wherein:
the workflow generator further uses the rules to select a non-printing activity, and incorporates the non-printing activity into the ordered set of activities of a custom workflow.

6. The system of claim 5, wherein:
the non-printing activity is selected from the group consisting of pre-printing document review ("pre-flight"), billing, performing a credit check, or shipping.

7. The system of claim 1, wherein:
the workflow generator identifies independent activities based on whether or not the activities of the custom workflow require resources that cannot be shared at the same time.

8. The system of claim 1, wherein:
the workflow generator further generates a custom workflow based on information describing a historical performance of the available activities.

9. A method comprising:
receiving a print job for each of multiple different customers;
accessing a memory that stores different workflow rules defined for each of the multiple different customers to identify rules for each of the customers based on the identity of each of the customers, where the workflow rules describe logical relationships of activities at a print shop;
identifying activities available at the print shop;
generating a custom workflow for each of the print jobs based on the identified rules defined for the customer that each print job is for, the available activities, and a job ticket of the print job, wherein each custom workflow comprises an ordered set of activities;
identifying print shop resources used for the activities in a custom workflow;
identifying sets of independent activities in the custom workflow based on the resources used by the workflow activities;
parallelizing the custom workflow by scheduling the sets of independent activities to be performed in parallel; and
directing resources of the print shop to perform the activities of each custom workflow.

10. The method of claim 9, further comprising:
detecting completion of each custom workflow; and
removing each custom workflow from the memory responsive to detecting its completion.

11. The method of claim 9, wherein:
each custom workflow is not based on one or more predefined templates, and each custom workflow does not exist in the memory prior to receiving the print job that the workflow is for.

12. The method of claim 9, wherein:
the rules define priorities for the print shop activities; and
each custom workflow is created based upon the priorities of the print shop activities.

13. The method of claim 9, further comprising:
using the rules to select a non-printing activity; and
incorporating the non-printing activity into the ordered set of activities of a custom workflow.

14. The method of claim 13, wherein:
the non-printing activity is selected from the group consisting of pre-printing document review ("pre-flight"), billing, performing a credit check, or shipping.

15. The method of claim 9, further comprising:
identifying independent activities based on whether or not the activities of the custom workflow require resources that cannot be shared at the same time.

16. The method of claim 9, further comprising:
generating a custom workflow based on information describing a historical performance of the available activities.

17. a non-transitory computer readable medium embodying programmed instructions which, when executed by a processor, are operable for performing a method comprising:
receiving a print job for each of multiple different customers;
accessing a memory that stores different workflow rules defined for each of the multiple different customers to identify rules for each of the customers based on the identity of each of the customers, where the workflow rules describe logical relationships of activities at a print shop;
identifying activities available at the print shop;
generating a custom workflow for each of the print lobs based on the identified rules defined for the customer that each print job is for, the available activities, and a job ticket of the print job, wherein each custom workflow comprises an ordered set of activities;

identifying print shop resources used for the activities in a custom workflow;

identifying sets of independent activities in the custom workflow based on the resources used by the workflow activities;

parallelizing the custom workflow by scheduling the sets of independent activities to be performed in parallel; and directing resources of the print shop to perform the activities of each custom workflow.

18. The medium of claim 17, wherein the method further comprises:

detecting completion of each custom workflow; and removing each custom workflow from the memory responsive to detecting its completion.

19. The medium of claim 17, wherein:

each custom workflow is not based on one or more predefined templates, and each custom workflow does not exist in the memory prior to receiving the print job that the custom workflow is for.

20. The medium of claim 17, wherein:

the rules define priorities for the print shop activities; and each custom workflow is created based upon the priorities of the print shop activities.

\* \* \* \* \*